United States Patent [19]

Richardson

[11] 4,026,573
[45] May 31, 1977

[54] FOLDABLE MOTOR SCOOTER

[75] Inventor: Orland W. Richardson, Columbus, Ohio

[73] Assignee: Joseph Skilken & Co., Columbus, Ohio

[22] Filed: Apr. 21, 1976

[21] Appl. No.: 678,918

[52] U.S. Cl. .................................. 280/278; 180/31
[51] Int. Cl.² ........................................ B62K 15/00
[58] Field of Search ............. 280/278, 287; 180/30, 180/31, 32, 33 R, 34, 29, 35

[56] References Cited

UNITED STATES PATENTS

| | | | |
|---|---|---|---|
| 1,524,552 | 1/1925 | Hudry | 280/287 |
| 2,746,769 | 5/1956 | Hoogendoorn | 280/287 |
| 3,337,240 | 8/1967 | Rizzato | 280/278 |
| 3,354,975 | 11/1967 | Stuart | 180/31 |
| 3,354,976 | 11/1967 | Camps | 280/287 |
| 3,419,283 | 12/1968 | Newland | 280/278 |
| 3,434,558 | 3/1969 | Allen | 280/287 |
| 3,710,883 | 1/1973 | Rizzo | 180/33 R |
| 3,887,218 | 6/1975 | DiBlasi | 180/32 |

Primary Examiner—Joseph F. Peters, Jr.
Assistant Examiner—Jack D. Rubenstein
Attorney, Agent, or Firm—Browdy and Neimark

[57] ABSTRACT

A portable foldable motor scooter with a substantially triangular chassis, each corner of which is pivotable and one leg of which is hinged to allow the chassis to be folded to a collapsed condition. A steering column is pivotally connected to the forward corner of the chassis and is detachable from the chassis. The driver's seat is supported on front and rear linkages, the front linkage including a triangular portion containing the leg hinge of the chassis. A single removable pin normally locks this hinge and maintains the front seat-supporting linkage rigid. Upon removal of the pin the chassis can be folded to its collapsed position and the seat can be swung downwardly toward the rear wheel and can be latched to the rear wheel fender, holding the chassis in its collapsed position. The steering column has handle bars which can be swung inwardly and fastened so as not to protrude from the folded vehicle.

10 Claims, 11 Drawing Figures

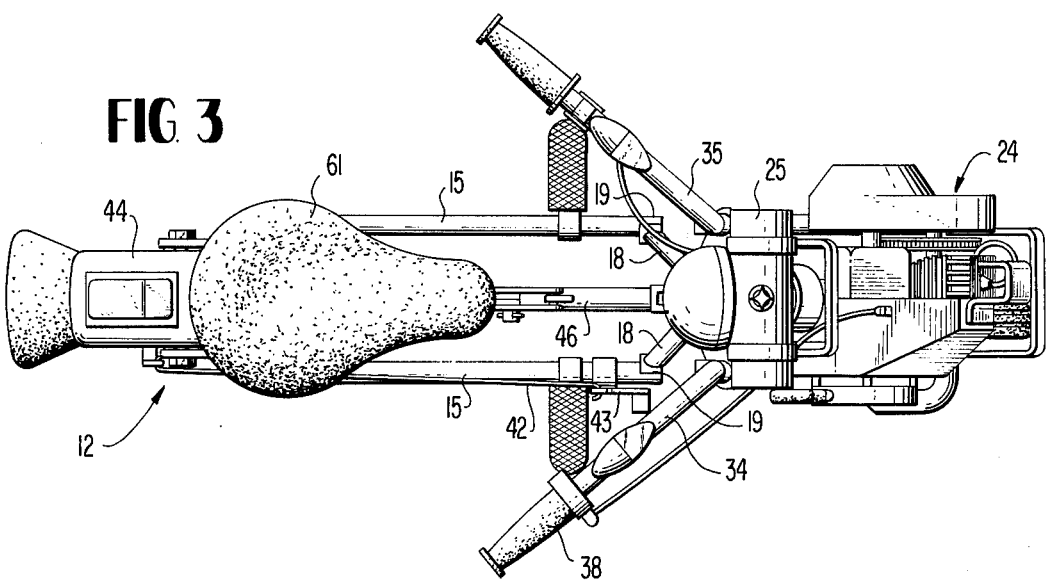
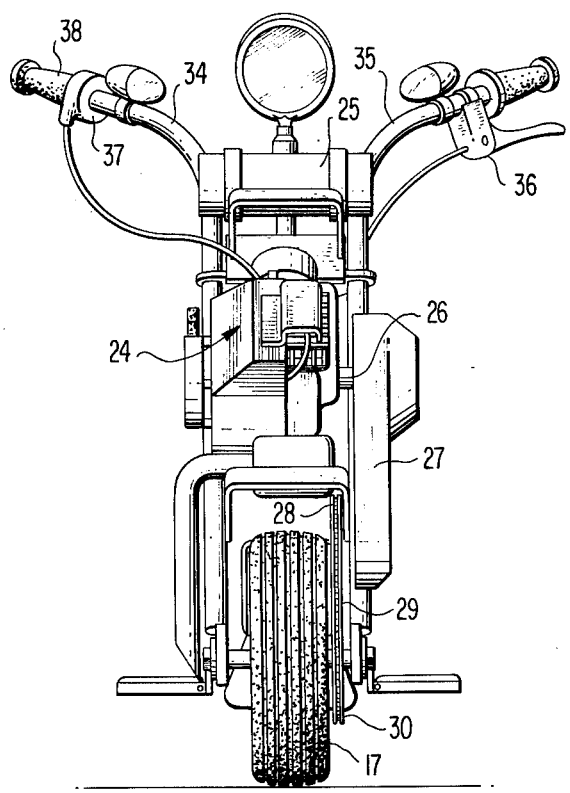
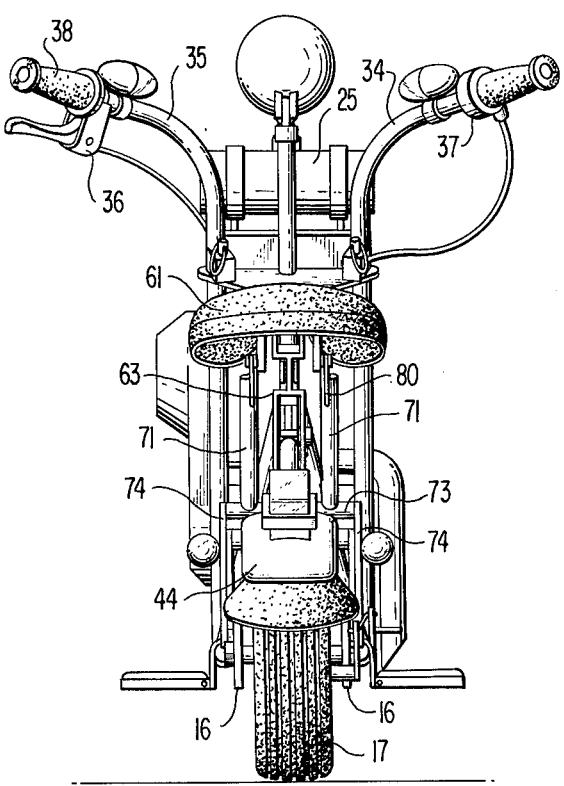

FOLDABLE MOTOR SCOOTER

This invention relates generally to vehicles, and more particularly to an improved portable vehicle of the motor scooter type including a foldable frame or chassis which permits the vehicle to be folded to a relatively small size so that it can be readily carried by hand, can be easily stores, can be carried in the trunk compartment of a passenger car, and can be readily unfolded for use whenever desired.

A main object of the invention is to provide a novel and improved foldable portable vehicle of the motor scooter type, the vehicle having a foldable frame which can be easily and rapidly folded to a collapsed position, converting the vehicle to a relatively compact package which is easy to carry, which is receivable in a limited amount of storage space, and which is small enough so that is can be stored, for example, in the trunk compartment of a conventional passenger automobile.

A further object of the invention is to provide an improved portable motor vehicle of the foldable type which includes a foldable main frame or chassis on which a set is supported and wherein the supporting structure for the seat is likewise foldable and is locked by the same single locking means employed for the main frame and wherein unlocking the main frame by removal of this single locking means allows the set to be swung downwardly concurrently with the folding of the main frame so that in the folded condition of the vehicle the seat is snugly received adjacent the folded main frame, providing a compact package, and enabling the package to be secured latched in its folded condition by hooking the seat to an adjacent portion of the vehicle, for example, to the rear wheel fender.

A still further object of the invention is to provide an improved portable foldable vehicle of the motor scooter type which includes a generally triangular chassis each corner of which is pivotable and which includes a hinged leg normally rigidly locked but which can be readily unlocked at times to allow the chassis to fold, the vehicle being easy to fold and unfold, being safe to use, involving relatively inexpensive parts, being capable of handling by a single person and without requiring special tools, and allowing the vehicle to be used in an entirely normal manner when unfolded for operation.

A still further object of the invention is to provide an improved portable foldable motor vehicle including a novel foldable frame or chassis on which a seat is foldably supported and which has supporting linkages foldable concurrently with the foldable chassis so that the seat can be compactly received between the steering column and the rear portion of the vehicle when the vehicle is folded, and which includes steering handle bars which can be swung inwardly so as to be received substantially in the plane of the folded assembly and be secured in inwardly swung positions, whereby the folded package has a minimum amount of protruding parts.

Further objects and advantages of the invention will become apparent from the following description and claims, and from the accompanying drawings, wherein:

FIG. 3 is a top plan view of the motor scooter of FIGS. 1 and 2.

FIG. 4 is a front end elevational view of the motor scooter of FIGS. 1 to 3.

FIG. 5 is a rear end elevational view of the motor scooter of FIGS. 1 to 3.

Figure 9:
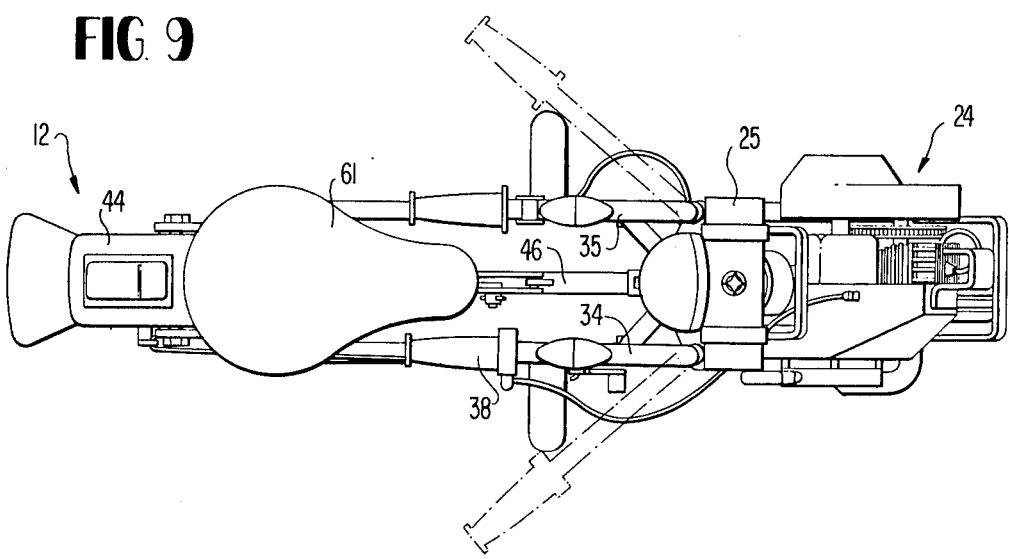

FIG. 9. is a top plan view generally similar to FIG. 3 but showing how the handle bars of the steering column may be swung to inwardly retracted positions substantially in the plane of the vehicle.

Figure 10:
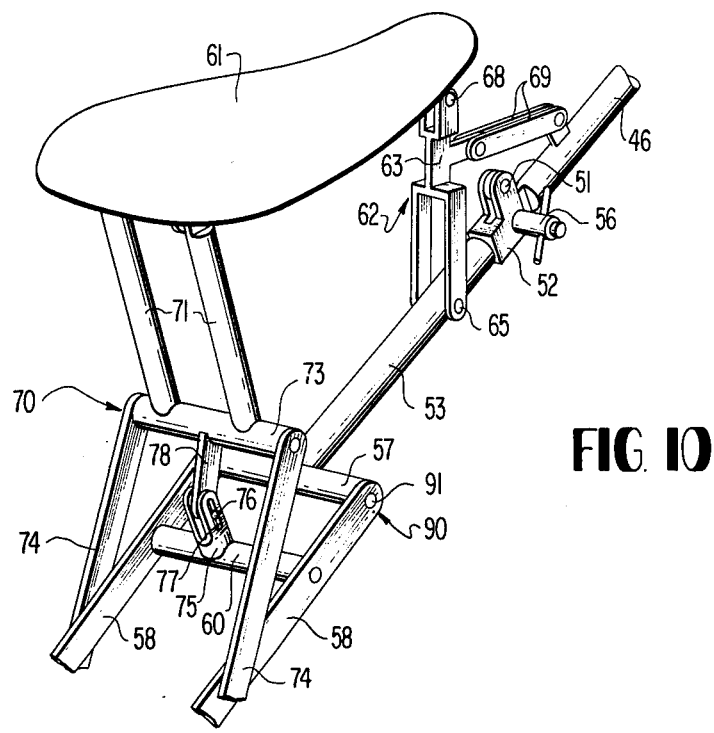

FIG. 10 is a fragmentary perspective view of the seat-supporting and chassis-locking structure of the vehicle of FIGS. 1 to 9 with the latching hook elements omitted, the parts being shown in normal positions.

Figure 7:
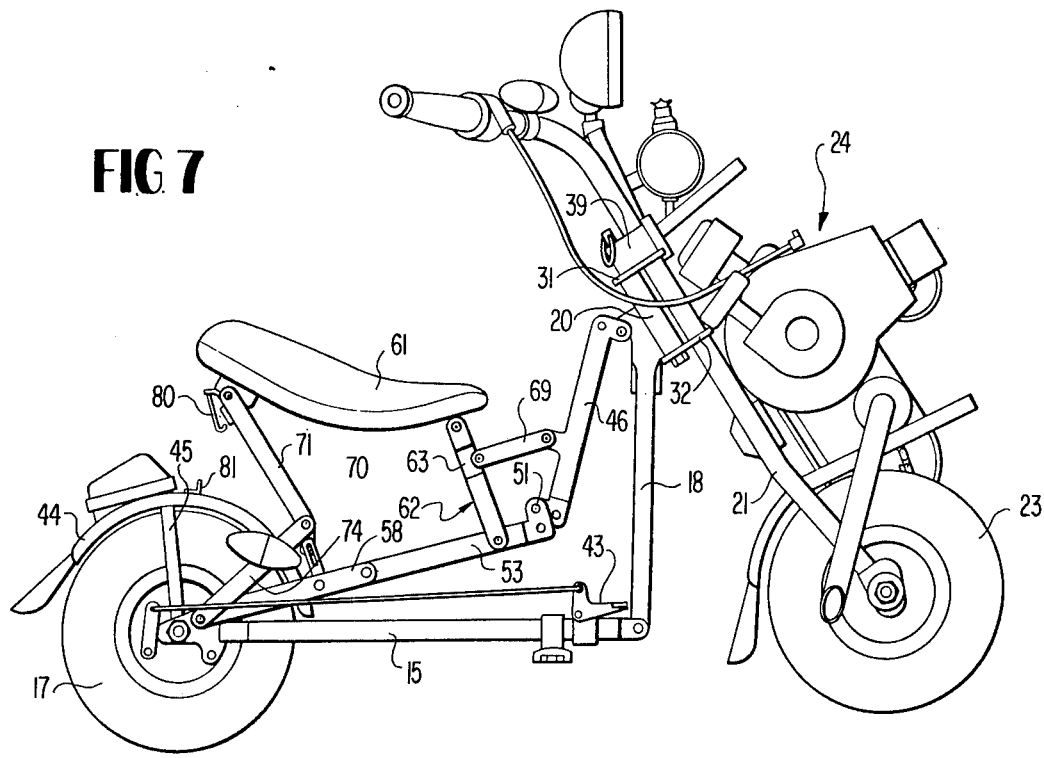
FIG. 7 is a view similar to FIG. 6 but showing a further stage of folding.
Figure 11:
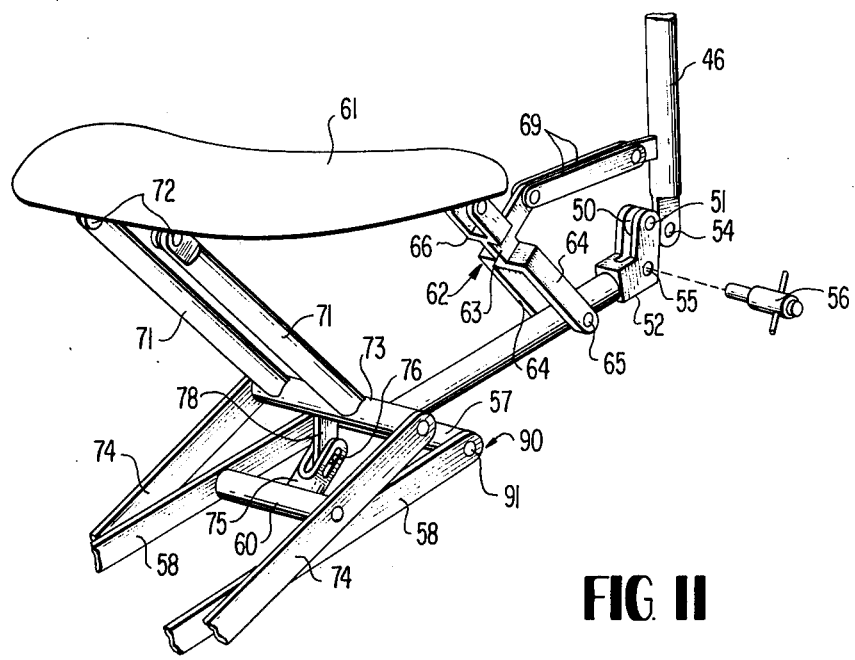

FIG. 11 is a fragmentary perspective view similar to FIG. 10 but showing the positions of the parts substantially at the folding stage of FIG. 7.

Various foldable motor scooter-type vehicles have been proposed in the prior art. For example, U.S. Pat. No. 3,354,975 to Robert W. Stuart discloses a typical foldable vehicle of this type. However, the prior art structures are unsatisfactory in that they are relatively complicated or require the use of special tools or a plurality of difficult sequential manipulations of parts in order to fold and unfold the vehicles, and in general are relatively difficult to handle. There has therefore arisen a need for a foldable vehicle which employs a minimum number of locking elements and which, in folding and unfolding, can be manipulated with a minimum number of actions on the part of the user. The improved foldable vehicle of the present invention fills this important need, since it employs a coordinated chassis and seat-supporting linkage arrangement locked by means of a single removable fastening element, which when removed, allows the parts to be automatically moved to a closely spaced relationship by a simple closing movement of the linkage arrangement. Conversely, the parts can be automatically returned to their normal operating positions by a simple opening movement of the linkage arrangement, followed by reinsertion of the fastening element to lock the chassis and set-supporting linkage arrangement in working position.

Referring to the drawings, a portable vehicle according to the present invention is designated generally at 12 and comprises a chassis indicated generally at 13 and a steering column indicated generally at 14.

The chassis 13 comprises a generally triangular frame having spaced parallel longitudinally extending bottom bars, 15, 15 rigidly connected at their rear ends to respective plate members 16, 16 between which is journalled the rear wheel 17. Upwardly convergent front frame bars 18, 18 are pivotally connected at 19, 19 to the forward ends of bottom bars 15, 15 and are rigidly connected at their top ends to an upstanding substantially vertical socket or sleeve portion 20 defining the substantially vertical steering axis for the steering column 14.

The steering column 14 comprises a yoke member 21 which is bifurcated and has journalled at its lower end, on a suitable transverse axle element 22, a front wheel 23. Suitably mounted on the yoke member 21 is suitable power means, indicated generally at 24, and comprising, for example, an internal combustion engine of any suitable type operatively connected to a fuel supply tank 25. The power means 24 includes a power output shaft 26 drivingly connected through suitable transmission means 27 to an output sprocket 28, which is coupled by a drive chain 29 to a sprocket 30 rigidly connected to front wheel 23. The transmission means 27 may include speed-responsive clutch means and the like, known in the art. In addition, suitable control means for the power means 24 may be provided on the upper end of the steering column, as is conventional in motor scooters of the same general type as shown herein.

The yoke member 21 has suitably mounted thereon rearwardly projecting vertically spaced bracket elements 31, 32 accommodating the sleeve member 20 therebetween and receiving therein a removable coupling pin 33 defining the vertical steering axis of the steering column 14. The yoke member 21 includes in the upper portions thereof handle bars 34 and 35, the lower ends of which are swivelly received in the yoke member and define substantially vertical pivot axes for said handle bars. The handle bars 34, 35 may carry thereon conventional fuel supply and choke controls 36, 37 adjacent handle grips 38, as shown. Abutment arms 39 are provided on the handle bars 34, 35 above upper bracket element 31, the arms having vertically movable detent pins 40 engageable in apertures in bracket element 31 for retaining the handle bars in different positions of rotation in the bifurcated portions of the yoke member 21, for example, in their normal laterally projecting positions, or in retracted positions as shown in full-line view in FIG. 9 wherein the handle bars have been rotated inwardly so as to be substantially in the vertical plane of the vehicle.

Figure 1:
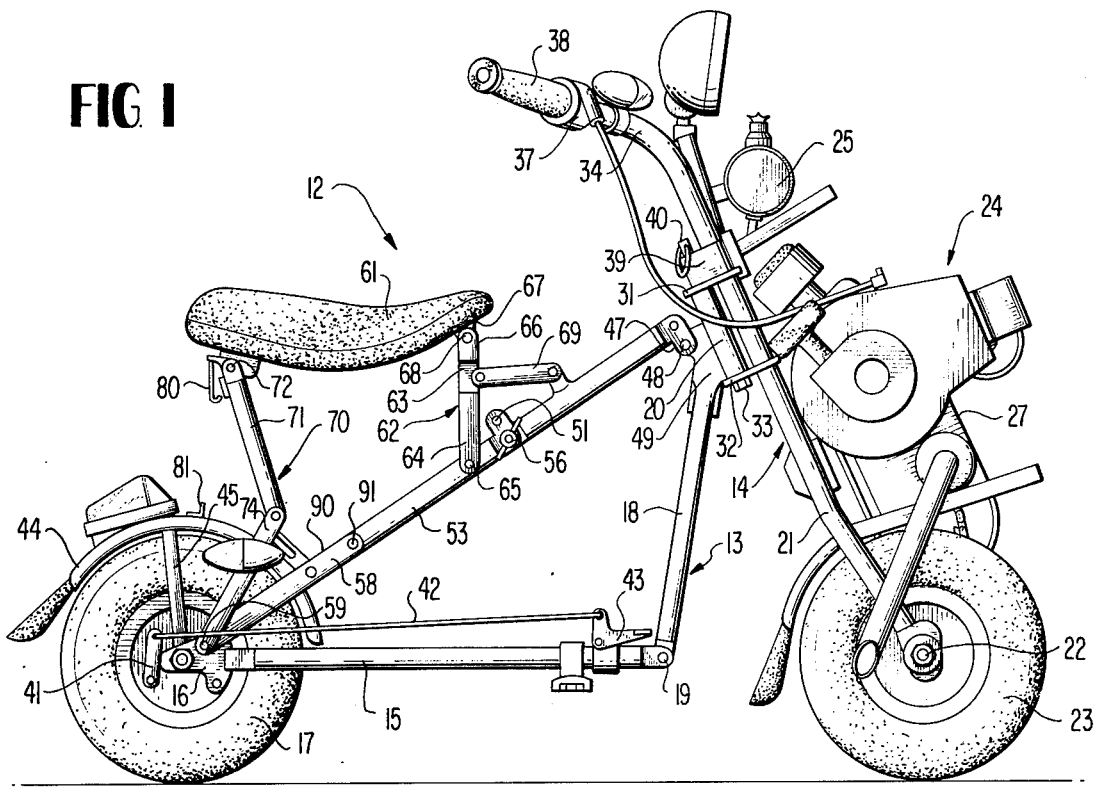
FIG. 1 is a right side elevational view of an improved foldable motor scooter constructed in accordance with the present invention.
Figure 2:
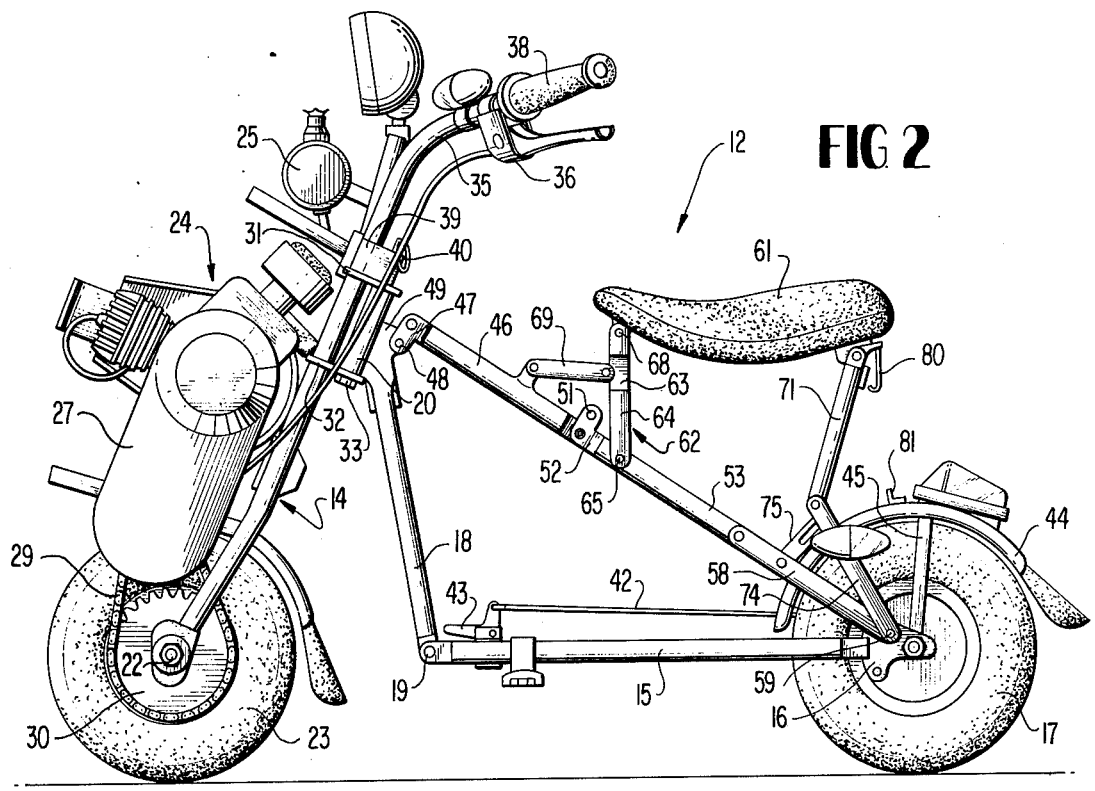
FIG. 2 is a left side elevational view of the motor scooter of FIG. 1.

The rear wheel 17 is provided with conventional brake means including an operating lever 41 connected by a tie rod 42 to a foot pedal 43 pivoted to the right side bottom frame bar 15, as shown in FIG. 1. Rear wheel 17 is also provided with a top fender 44 overlying the wheel and rigidly connected by support bars 45, 45 to the rear corner frame plates 16, 16.

The upper leg of the generally triangular chassis 13 comprises a front bar segment 46 having a depending forward end lug 47 pivotally connected at 48 to a vertical web or flange 49 extending rearwardly from sleeve member 20. The rear end of bar segment 46 has an L-shaped flat lug 50 (see FIG. 11) which is received in and pivotally connected at its top portion, as shown at 51, to the top portion of an L-shaped yoke member 52 rigidly secured to the forward end of a rear bar segment 53. The corner portion of lug 51 has an aperture 54 registrable with apertures 55 in the corner portion of yoke member 52 to receive a headed locking pin or fastener 56 to hold the bar segments 53, 46 in aligned positions, as in FIGS. 1 to 5 and FIG. 10. Removal of fastener 56 allows hinge action between bar segments 53, 46, as shown in FIG. 11.

Locking fastener 56 may be retained in locking position through the apertures 54, 55 in any suitable manner. For example, the shank portion of fastener 56 may threadedly engage the aperture 55 and serve as a hinge pin in aperture 54; alternatively, a removable clip or cotter pin may be engaged on or through the exposed pin end portion of the fastener 56 to retain it in locking position in the apertures 54, 55.

Rear bar segment 53 is rigidly secured to the cross bar 57 of a yoke structure 90 comprising said cross bar 57 and parallel side bars 58, 58 whose forward ends are pivotally connected at 91 for limited rotation to the ends of said cross bar. Side bars 58, 58 are pivotally connected at their rear ends to plate members 16, 16 at 59, 59. Another cross bar 60 is rotatably connected between side bars 58, 58, spaced rearwardly from cross bar 57.

The driver's seat, shown at 61, is supported at its forward end by a linkage indicated generally at 62. Linkage 62 comprises a main yoke 63 having bottom arms 64, 64 embracing and pivoted to bar segment 53 at 65. The member 63 has a top yoke portion 66 receiving a lug 67 depending from seat 61 and pivoted thereto at 68. A pair of parallel link bars 69, 69 connects the intermediate portion of member 63 to front bar segment 46. With segments 53, 46 locked in aligned positions by fastener 56, linkage 62 is rigidly locked.

Seat 61 is supported at its rear end by a linkage indicated generally at 70, comprising a pair of bar members 71, 71 pivoted to seat 61 at 72, 72 and rigidly connected at their bottom ends to a cross bar 73. The ends of cross bar 73 are connected by link bars 74, 74 to the pivots 59, 59.

A guide arm 78 rigidly secured to cross bar 73 is rotatably and slidably connected to a lug 75 rigidly secured on rotatable cross bar 60. Thus, the lug 75 is slotted to receive lug 78, and pins 76 on lug 78 engage in slots 77 provided in the opposite walls of the slotted lug 75. The pin-and-slot connection between lugs 78 and 75 acts as a limiting means to limit rotation of the link bars 74 and 58 relative to each other. Furthermore, the pin-and-slot connection additionally connects the bell crank defined by bars 71 and 78 through cross bar 60 to the side bars 58,58 to normally maintain said side bars substantially coplanar with bar segment 53 under the weight of the driver on the seat 61 as said seat pivots around pivot connections 68 during travel of the vehicle.

Figure 8:
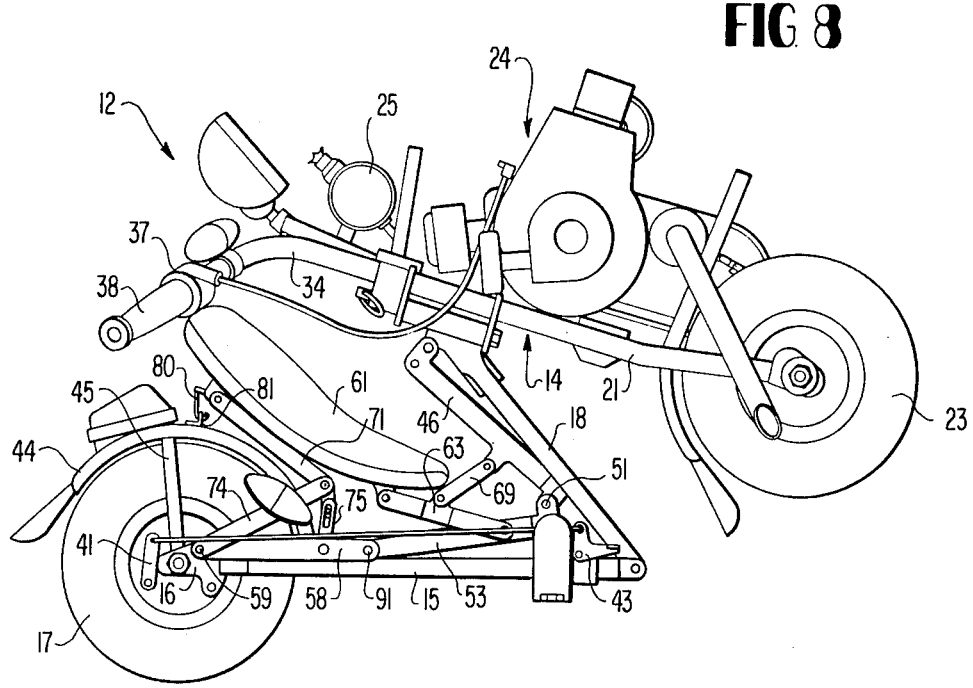
FIG. 8 is a view similar to FIGS. 6 and 7 but showing a still further stage of folding, wherein the chassis is locked in its folded condition.

Depending resilient latch hooks 80 may be provided at the top ends of bar members 71, arranged to be lockingly interengageable with apertured latch brackets 81 which may be provided on fender 44, to latch the vehicle in folded position, as shown in FIG. 8.

Figure 6:
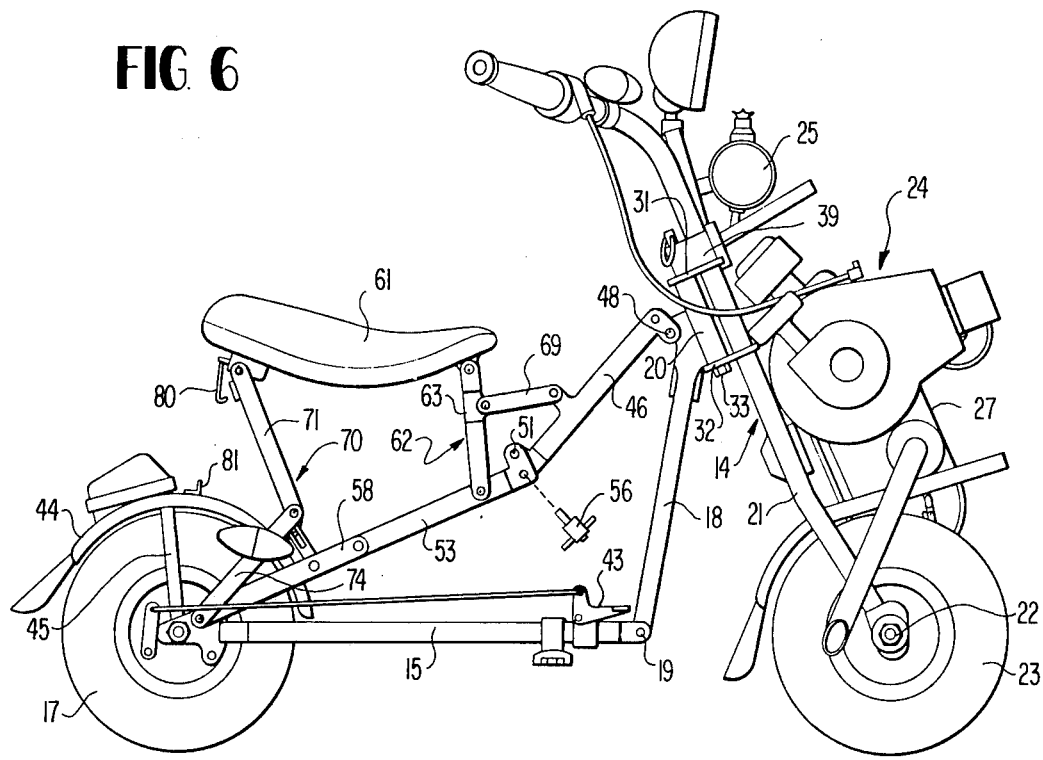
FIG. 6 is a right side elevational view of the motor scooter of FIGS. 1 to 5 with the chassis locking member removed, and showing an early stage in the folding of the vehicle.

When it is desired to fold the vehicle 12 for transportation or storage, the fastener 56 is removed, as shown in FIG. 6, thereby unlocking the hinge connection at 51. Bar segment 46 may then be swung counterclockwise relative to bar segment 53, through the positions of FIGS. 6 and 7 toward the folded position of FIG. 8, in which folded position the parts may be locked by engaging the latch hooks 80 in the apertured latch brackets 81; obviously, any other equivalent latch means may be employed.

Prior to folding the vehicle as above described, the handle bars 34, 35 may be retracted inwardly from their normal positions to their full-line positions shown in FIG. 9, in the manner previously described, and may be locked in such retracted positions by means of the locking detent members 40.

It will be noted that as the bar segment 46 is swung counterclockwise as viewed in FIG. 6, leg 18 is also swung counterclockwise around pivot 19, and linkage 62 drives seat 61 downwardly toward fender 44. In the final folded position of FIG. 8, the latch hooks 80 are close enough to the apertured bracket members 81 to be lockingly engaged therewith, with a sufficient amount of tension on the hooks 80 to retain them in locking interengagement with the apertured brackets 81.

To restore the vehicle to its operative condition, the hooks 80 are disengaged from the brackets 81 and the bar segments 53, 46 are realigned, to bring the apertures 54 and 55 into registry. The fastening member 56 is then engaged through said apertures and locked therein, as above described. The handle bars 34, 35 may then be released and returned to their normal laterally extending positions and locked in said normal positions by means of the locking detent members 40.

While a specific embodiment of an improved portable foldable vehicle has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a portable foldable vehicle, in combination, a chassis and a steering column, said chassis comprising a substantially triangular frame having top, front and bottom leg portions pivotally connected at the corners of the frame, substantially vertical pivot means connecting said steering column to the upper front corner of the frame, one of said leg portions having intermediate hinge means allowing the frame to be folded, releasable means normally locking said hinge means and being releasable at times to permit folding of said frames, a driver's seat, means normally supporting said seat on the frame in a position elevated above said top leg portion, means to lower said seat toward the frame responsive to folding of the frame, means to bring said steering column over and adjacent to the seat as the frame is folded, and means to releasably lock the frame in folded position.

2. The structural combination of claim 1, and wherein said intermediate hinge means is located in said top leg portion, defining foldable front and rear segments.

3. The structural combination of claim 2, and wherein said seat-lowering means comprises drive linkage means connecting said seat to said front and rear segments.

4. The structural combination of claim 3, and wherein said drive linkage means comprises a first link member connecting said seat to one of the segments and a second link member connecting said first link member to the other segment.

5. The structural combination of claim 3, and wherein said drive linkage means connects the front portion of said seat to said front and rear segments.

6. The structural combination of claim 5, and wherein said seat supporting means includes a rear supporting linkage assembly connecting the rear portion of the seat to the rear portion of the frame, and means to maintain said rear supporting linkage assembly substantially in an extended condition while said hinge means is locked.

7. The structural combination of claim 6, and wherein said rear supporting linkage assembly comprises an upper link element connected to the rear portion of the seat, a lower link element connecting said upper link element to the rear corner portion of the frame, and means movably connecting said lower link element to a portion of said rear segment of the frame upper leg portion and limiting rotation of said lower link element.

8. The structural combination of claim 6, and wherein the rear portion of said rear segment comprises a pivoted member connected between the rear corner portion of the frame and the remainder of said rear segment, and wherein said rear supporting linkage assembly comprises an upper link element connected to the rear portion of the seat, a lower link element connecting said upper link element to the rear corner portion of the frame, and means supportingly connecting said upper link element to said pivoted member.

9. The structural combination of claim 8, and wherein said means supportingly connecting said upper link element to said pivoted member comprises a bell crank arm on said upper link element and means defining a pin-and-slot connection between said bell crank arm and said pivoted member.

10. The structural combination of claim 1, and wherein said top leg portion comprises front and rear segments, wherein said hinge means comprises cooperating offset hinge lug means on the segments with hinge pin means connecting them at a point offset from the axes of the segments, and wherein the releasable hinge locking means comprises removable pin means simultaneously engageable through said cooperating hinge lug means at a location spaced from said hinge pin means.

* * * * *